UNITED STATES PATENT OFFICE.

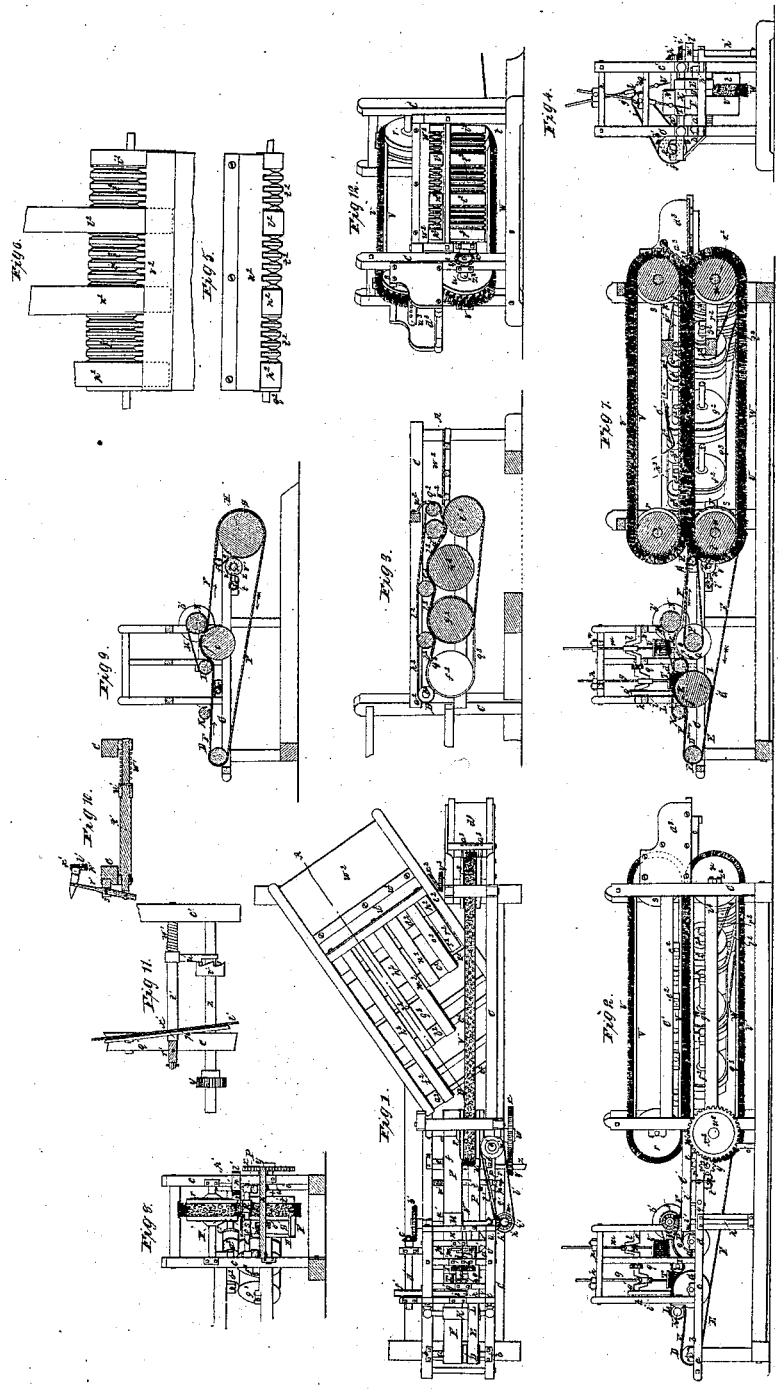

GEO. E. BURT, OF WESTFORD, MASSACHUSETTS, ASSIGNOR TO G. E. BURT AND DAVID C. BUTTERFIELD.

MACHINE FOR CLEANING AND ASSORTING BRISTLES.

Specification forming part of Letters Patent No. 10,498, dated February 7, 1854; Reissued December 1, 1868, Nos. 3,220 and 3,221.

*To all whom it may concern:*

Be it known that I, GEORGE EDWARD BURT, of Westford, in the county of Middlesex and State of Massachusetts, have invented a new and useful or Improved Machine for Dragging or Assorting Bristles, &c.; and I do hereby declare that the same is fully described and represented in the following specification and the accompanying drawings, letters, figures, and references thereof.

Of the said drawings Figure 1, denotes a top view of my said machine. Fig. 2, is a front elevation of it. Fig. 3, is a vertical and longitudinal section of the drawing mechanism, the said section being taken from A to B of Fig. 1. Fig. 4, is a rear end view of the machine. Fig. 5, is a side elevation of the upper discharging roller and its comb guard. Fig. 6, is a top view of the lower discharging roller and its comb guard. Fig. 7, is a vertical and longitudinal section of the machine, the same being taken through the endless brush belts to be hereinafter described.

The operative parts of the machinery are supported by a strong frame C, made of wood or other suitable material. At one, or the rear end of this frame is a horizontal roller D, fixed on a shaft, $a$, whose journals rest and turn in boxes $b$, $b$. Two endless belts E, F, work around the roller D, one of these belts, (viz., F) being about twice the width of the other. The narrowest belt (E) also works around a wheel or pulley, G, which is arranged as seen in Figs. 1 and 7, and fixed on a transverse horizontal shaft, $c$. The other or widest belt at its front passes around an endless belt S, working on a wheel or pulley, H, which is shown in Fig. 8, which is a vertical and transverse section of the machine taken through the driving shaft. It is also shown in Fig. 9, to be hereinafter described. Two other cylindric rollers I, K, are arranged respectively just in front and rear of the wheel, G, and with their upper surfaces nearly on a level with, and a little above that of the said wheel, G. An endless belt, L, works around the two rollers I, K, and rests on the belt, E, both belts, L, and E, being borne down upon one another, and made between the rollers I, K, to stretch over about one-third of the periphery of the roller, G. Another endless belt, M, placed directly over the belt, F, works around the roller, I, and a roller N, disposed as seen in Figs. 7 and 9, the said belt M, as well as the belt, F, being together led over a wheel or pulley, O, that is made to extend up between the two wheels or pulleys I, N, as seen in Fig. 9. A fifth endless belt, P, is made to extend in line with the belt, E, and around two wheels or pulleys Q, R. The pulleys, Q and O, are placed side by side on one horizontal shaft, $d$, while the pulley R, is situated on another shaft, $e$, which also has another pulley, $f$, placed on it directly under the belt, F, as seen in Fig. 9, which is a vertical section of the belt F, and the several pulleys and rollers around and with which it operates. An endless belt S, works around the pulley, $f$, and the pulley H, beforementioned.

Between the rollers I, K, and over the endless belt, F, is a comb or rake T, that is attached to the lower end of a long rod $g$, that passes and slides freely through a short rocker shaft, $h$, and receives a transverse reciprocating movement from a belt, $i$, of a rotary shaft, $k$. The lower edges of the comb teeth are made to move in an elliptical path over the belt F, which causes the teeth to enter into and comb any bristles that may be on the belt. Another such comb, U, is also arranged just in advance of the belt, L, and by the side of the pulley, O. The said comb or rake U, is operated like the comb T, by means of a bell crank, $l$, a rod, $m$, and a rocker shaft, $n$, the two shafts, $k$, and $o$, of the bell cranks being connected by gears $p$, $q$, as seen in Fig. 1, so that when one is put in revolution, the other will be simultaneously rotated.

If when the several endless belts are made to move in the directions denoted by the arrows on them, a lot of the bristles is laid on the two belts E, F, so as to extend from one to the other transversely of the machine, they will be seized by and carried in between the two belts, E and L, where they pass over the wheel, G, and will be lifted off and some distance above the belt, F, so that the comb or rake T, can pass between them and comb or straighten such portions of them as project out of the two holding belts E, L. The bristles are next carried downward toward the belt, F, and their combed portions are seized by and carried between those parts of the belts, F and M, that together work over the wheel, O, the uncombed portions, or those which were previously grasped by and between the belts, E and L, being made by such operation to leave the said belts, E and L, and project beyond the wheel, O, and be raised upward in such manner as to enable the comb, U, to pass into them and comb or straighten them out. After undergoing the combing process, the bristles are made to descend and pass on, to the upper surfaces of the two endless belts F and P, which are disposed on or about on the same plane, and move at the same velocity, and convey the bristles to the endless brush belts, V, W. These endless brush belts consist of two endless bands supported on and around wheels or rollers $r$, $s$, $t$, $u$, (the rollers $r$, $s$, being placed respectively over the rollers $t$, $u$, as seen in the drawings) and having bristles extended from their outer surfaces, as seen at $v$. The upper brush belt is arranged directly over the lower one, and at such a distance from it, that their bristles projecting from their most contiguous surfaces extend or mesh in between one another, like the teeth of two gear wheels. The shaft, $w$, of the wheels, $t$, and H, has a gear wheel $x$ fixed on one end of it, which is made to engage with and be revolved by a pinion gear, $y$, that is placed on a driving shaft $z$, situated as seen in Figs. 2 and 8.

The endless belt, F, receives its motion from the pulley, H, when the latter is revolved by a rotary movement of its shaft. Such movement of the belt, F, imparts corresponding movement to the several rollers and endless belts, which as hereinbefore described operate in connection with the two combs, T, U.

On one end of the shaft $a'$ of the roller N, there is fixed a large beveled gear, $b'$, which is made to engage with a bevel pinion, $c'$, fixed on a shaft $d'$. An endless belt, $i'$, is made to work around two pulleys, $f'$, $g'$, the former being fixed on the shaft $d'$, while the latter is fixed on the bell crank shaft, $k$. By such means, motion is communicated from the roller N, to the shaft $k$, in order to put the two combs in operation. Another bevel gear, $h'$, is placed on the other end of the shaft $a'$, and is made to engage with and turn a bevel gear, $i'$, fixed on the top of a vertical shaft, $k'$, the whole being arranged as seen in Figs. 1, 2, and 4. An endless belt, $l'$, is arranged as seen in said figures, and so as to work horizontally around two pullies, $m'$, $n'$, fixed respectively on the two upright shafts, $k'$, $o'$. The inner face of the belt is inclined toward the two brush belts, V, W, and the front pulley of the endless belt, P, and behind against the inner portion of the belt, $l'$, a spring or board, $p'$, is placed as seen in Fig. 1, it being supported at or near its rear end by a standard or port, $q'$.

A small hammer lever, $r'$, is arranged against the outer face of the board, $p'$, as seen in Figs. 1, 2, and 10, the latter figure, being a vertical section of the hammer lever and its slide shaft and the spring thereof. The said hammer $r'$, turns on a fulcrum, $s'$, and is jointed at its lower end to a sliding horizontal shaft, $t'$, from which a projection, $u'$, extends as seen in Fig. 11, which is a top view of this shaft and the driving shaft adjacent to it. A cam wheel, $v'$, affixed on the driving shaft and provided with a series of cams on its side next the arm, $u'$, so acts against the said arm, during the rotary movement of the driving shaft, as to successively move it in one direction, and allow it during such movements to be moved back in the opposite direction by spring, $w'$. This longitudinal movement of the shaft causes the hammer, $r'$, to rapidly strike against the board, $p'$, or a small anvil $x'$, attached to it. Now as the bristles are moved along by the endless belts, P, and F, their ends next the belt, $i'$, will be carried in contact with such belt, and by means of the concussion of the raps or blows of the hammer, $r'$, against the spring board, $p'$, these bristles will be so agitated or disturbed as not only to prevent an adhesion of their buts or roots to the guide belt, $l'$, (whereby by the forward movement of the endless belts, on which they rest, the bristles would be liable to be thrown around or out of place) but also to cause them to settle properly on the supporting belts for presentation to the endless brush belts.

The bristles are received at their buts by the two endless brush belts, and are held by and between the bristles thereof. As the bristles so held are of various lengths, they are next to be seized and drawn away from the brush belts, the longest ones being the first, and the shortest being the last to be drawn away. The mechanism for producing this effect may be thus described; Four rollers or cylinders $a^2$, $b^2$, $c^2$, $d^2$, of different lengths are arranged respectively on four parallel and horizontal shafts $e^2$, $e^2$, $e^2$, $e^2$, that are disposed obliquely to the vertical plane of the two endless brush belts V, W, all as seen in Fig. 1. Just in front of and below each one of these rollers, is a larger roller, ($f^2$, $g^2$, $h^2$, or $i^2$,) made of the same length as the roller, to which it appertains. The upper edge of either of the lower rollers, ($f^2$, $g^2$, $h^2$, or $i^2$,) is made to stand somewhat above the lower edge of the roller ($a^2$, $b^2$, $c^2$, or $d^2$,) above and next adjacent to it. A series of endless belts $k^2$, $l^2$, $m^2$, $n^2$, $o^2$, $p^2$, is applied to the upper set of rollers ($a^2$, $b^2$, $c^2$, $d^2$). The first or longest belt passes around the rollers, $a^2$, $d^2$, and above and below the rollers $b^2$, $c^2$ and rests on another endless belt, $q^3$, that extends around the rollers, $f^2$, $g^2$, as seen in Fig. 3. The next endless belt ($l^2$) extends from and around the roller, $b^2$, and the upper of two grooved delivery rollers, $q^2$, $i^2$, and goes over and under said rollers $c^2$, $d^2$. The endless belt ($m^2$) extends from the roller, $b^2$, to the roller $l^2$, and goes both above and below the roller, $c^2$. So with the next belt $n^2$, it extends from the roller, $c^2$, to the upper delivery roller, $q^2$, while the belt, $o^2$, extends from the roller, $c^2$, to the roller, $d^2$. Each belt $k^2$, $l^2$, $m^2$, $n^2$, $o^2$, operates in connection with an endless belt placed under it and made to pass around some of the rollers $f^2$, $g^2$, $h^2$, $i^2$, as does the belt, $q^3$. The last, $p^2$, travels around the roller, $d^2$, and the upper delivery roller $q^2$, and it has its belt, $r^2$, under it, which belt plays around the roller, $i^2$, and a pulley or wheel, $s^2$, fixed on the shaft of the roller, $h^2$. The upper delivery or discharging roller, $q^2$, as well as the lower one, $i^2$, is constructed with numerous grooves $t^2$, $t^2$, extending transversely around them, the said grooves of each roller being made respectively to receive the teeth of one of two combs $u^2$, $v^2$, arranged as seen in Figs. 3, 5, and 6. These combs or guards serve in connection with the grooves to prevent the discharged bristles not only from passing up over the upper delivery roller, but from passing down under the lower one. A suitable box or receptacle, $w^2$, is arranged to receive the bristles as they are dicharged from the delivery rollers.

I would remark, that the endless belts of the delivery rollers are to move with the same or about the same velocity as that of the endless brush belts, also, that the rollers $a^2$, $b^2$, $c^2$, are placed at different distances from the two belts V, W, the roller, $c^2$, being nearer thereto than the roller, $b^2$, while this latter is nearer than the roller, $a^2$. Now as these latter belts, viz., V, W, hold the bristles at their butts, and as the bristles are of various lengths, they will be seized by and between the endless belts $k^2$, $m^2$, $o^2$, and those directly under them and drawn out of the brush belts, those bristles beyond a certain length being first removed, (by the belt, $k^2$, and its fellow under it) while those whose length is between such first mentioned length and a lesser standard of length, being next removed by the belt, $m^2$, and that directly below it. The next size of bristles will be seized and drawn away from the brush belt, by the belt, $o^2$, and that directly under it. Finally the bristles in assorted sizes will be delivered into the box or receptacle, $w^2$.

The proper movements of the endless belt draft and delivery mechanism are produced by rotating the lower delivery roller, and in order to do this, there is a beveled gear, $x^2$, fixed on its shaft and made to engage with another such gear, $y^2$, placed on the shaft, $z^2$, of the front roller of the lower endless brush belt, (see Fig. 12,) which is a front end view of the machine.

In order to clean each of the brush belts, V, W, of the refuse bristles that may be left in them, I apply to each of them a stationary comb as seen at, $a^3$, $b^3$, in Figs. 7, and 12. These combs discharge the said refuse upon a platform or into a suitable receptacle $d^3$.

My machine differs essentially in its operations from that patented by Lorenzo D. Grosvenor, on the first day of January A. D. 1851, the said Grosvenor's machine having been found not adapted to the assorting of bristles, although it answers well in assorting broom corn.

What I claim as of my invention is as follows:

1. I claim the combination of machinery for combing or straightening the bristles, and machinery for separating or assorting them as specified.

2. I claim the combination of the two movable combs or rakes T, U, and the two lifter wheels G, O, and their carrying endless belts, E, and L, F and M, so arranged as above described, the whole being for the purpose of first holding the mass of the bristles by one part or portion of it, and lifting and combing the remainder of it, and subsequently seizing and lifting it by such combed part or portion and combing the part previously seized all as specified.

3. And in combination with the machinery for combing or straightening the bristles, and machinery for assorting or separating them, I claim the endless guide belt, $b'$, the spring board, $p'$, and rapping apparatus or hammer, $r'$, as applied and made to operate substantially in manner as specified.

4. I do not claim the combination of an endless platform, a roller, and a series of pressure rollers, as employed in the hereinbefore mentioned machine of the said Lorenzo D. Grosvenor, but what I do claim as of my invention, is, the combination and arrangement of the two endless brush belts (V, W,) and two series of draft rollers, and their two sets of endless bands as made to operate together and assort the bristles substantially as hereinbefore specified.

5. I claim the combination of the combs, ($u^2$, $v^2$,) and their grooves ($t^2$, $t^2$, &c.) with the delivery rollers, so as to operate substantially in manner and for the purpose as specified.

In testimony whereof I have hereto set my signature this second day of April A. D. 1853.

GEORGE E. BURT.

Witnesses:
R. N. Eddy,
F. P. Hale, Jr.